UNITED STATES PATENT OFFICE.

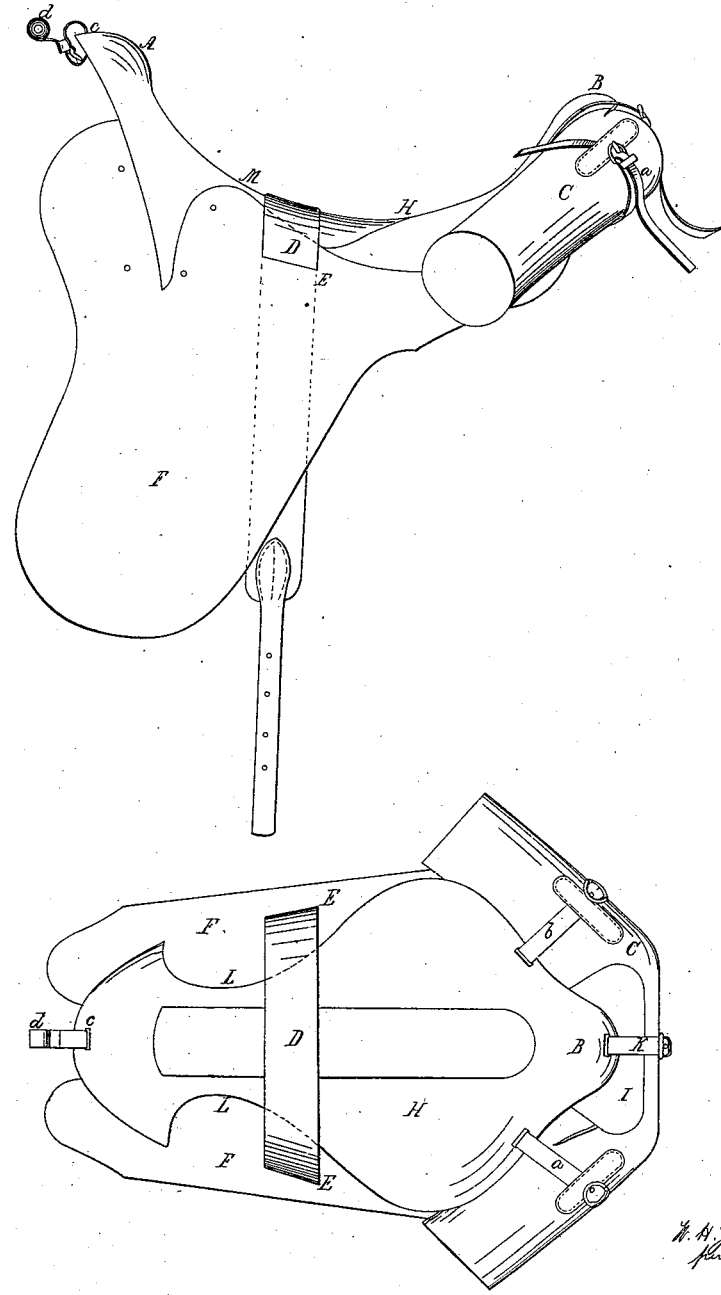

WALTER H. JENIFER, OF BALTIMORE, MARYLAND.

MILITARY SADDLE.

Specification of Letters Patent No. 28,867, dated June 26, 1860.

*To all whom it may concern:*

Be it known that I, WALTER H. JENIFER, of Baltimore city, in the State of Maryland, have invented a new and Improved Military Saddle; and I do hereby declare that the following is a full and exact description thereof, reference being had to the accompanying drawings, in which—

Figure 1 is a plan view and Fig. 2 is a side elevation.

Letter H, represents in the accompanying drawings, a flat English seat; A, the curved pommel; B, the curved cantle; C, the valise; F, the flaps; D, the surcingle; E, E, the slots through which the surcingle D passes.

The saddle tree of my military saddle, though made in the same manner as those in common use, is materially modified in shape, or form. It has the common flat English seat H, with the bars sloping toward the pommel sufficiently to fit the rider's form, as shown by M, Fig. 2, and at the same time not rising so abruptly as to injure the rider, if he were thrown suddenly upon the front of the seat. The bars are also curved at L in such a manner as to allow the rider to maintain a firm pressure against the sides of the horse.

The cantle B is not so high nor so abrupt in its rise, as those in common use. The pommel has a slot $c$, through which a strap $d$ is passed, intended for carrying an overcoat.

The surcingle D, passing through the slots E, E, in the flaps F, instead of encompassing the whole of the flaps, has this advantage: It does not press the flaps against the horse's sides, but allowing them to swing free, admits a cooling current of air to the parts of the horse covered by the flaps. I also use the common girth in addition to the surcingle.

The leather flaps F, range forward in the direction which the legs of the rider take when mounted, as shown in Fig. 2. This peculiar form has the twofold advantage of being less cumbersome than the common flaps, and at the same time prevents contact with the fore legs of the horse, when in action. The valise C, is one continuous semicircular pouch, fitting tight around the cantle of the saddle. It is furnished with an opening large enough to admit of necessary articles being inserted; it is covered by a flap I, and is secured to the saddle by the straps $a$, $b$ and K. This valise does not rise above the top of the cantle, nor does it protrude so low as to interfere with the rider's action when mounting or dismounting.

What I claim as new and desire to secure by Letters-Patent, is—

The combination and arrangement of the flat English seat H, the curved cantle B, the pommel A, the curved valise C, the flaps F, surcingle D, slots E, E; the whole constructed and used as specified.

W. H. JENIFER.

Witnesses:
GILBERT B. TOWLES,
WM. H. HARRISON.